(12) United States Patent
Wilson et al.

(10) Patent No.: US 7,464,046 B2
(45) Date of Patent: Dec. 9, 2008

(54) DISPATCH AND SERVICE SUPPORT SYSTEM

(75) Inventors: Christopher R. Wilson, Arnold, MO (US); Jeffrey R. Robbins, St. Charles, MO (US)

(73) Assignee: AT&T Intellectual Properties I, L.P., Reno, NV (US)

( * ) Notice: Subject to any disclaimer, the term of this patent is extended or adjusted under 35 U.S.C. 154(b) by 361 days.

(21) Appl. No.: 10/619,944

(22) Filed: Jul. 15, 2003

(65) Prior Publication Data
US 2005/0015292 A1 Jan. 20, 2005

(51) Int. Cl.
*G06Q 10/00* (2006.01)
(52) U.S. Cl. .............................. 705/9; 455/456.1
(58) Field of Classification Search ............. 705/7–9
See application file for complete search history.

(56) References Cited

U.S. PATENT DOCUMENTS

| | | | | |
|---|---|---|---|---|
| 5,467,268 | A | 11/1995 | Sisley et al. | 364/401 |
| 5,615,121 | A | 3/1997 | Babayev et al. | 395/209 |
| 5,737,728 | A | 4/1998 | Sisley et al. | 705/8 |
| 5,911,134 | A * | 6/1999 | Castonguay et al. | 705/9 |
| 5,920,846 | A | 7/1999 | Storch et al. | 705/7 |
| 6,049,776 | A * | 4/2000 | Donnelly et al. | 705/8 |
| 6,163,607 | A * | 12/2000 | Bogart et al. | 379/266.01 |
| 6,278,965 | B1 | 8/2001 | Glass et al. | 703/22 |
| 6,430,496 | B1 * | 8/2002 | Smith et al. | 701/117 |
| 6,578,005 | B1 * | 6/2003 | Lesaint et al. | 705/8 |
| 6,754,634 | B1 * | 6/2004 | Ho | 705/6 |
| 6,925,305 | B2 * | 8/2005 | Dawson et al. | 455/446 |
| 6,937,993 | B1 * | 8/2005 | Gabbita et al. | 705/8 |
| 7,058,508 | B2 * | 6/2006 | Combs et al. | 701/213 |
| 7,188,070 | B2 * | 3/2007 | Dar et al. | 705/1 |
| 7,412,400 | B1 * | 8/2008 | Bhela et al. | 705/10 |
| 2002/0002633 | A1 * | 1/2002 | Colling, III | 709/318 |
| 2005/0015504 | A1 * | 1/2005 | Dorne et al. | 709/229 |

FOREIGN PATENT DOCUMENTS

JP 11335020 A * 12/1999

OTHER PUBLICATIONS

Weigel, Don; Cao, Buyang; "Applying GIS and OR Techniques to Solve Sears Technician-Dispatching and Home Delivery Problems", Jan./Feb. 1999, Interfaces, 29, 1, ABI/INFORM Global, p. 112.*

Minorplanet Systems USA case study of Cadogan Tate, Feb. 15, 2002, p. 1. web.archive.org/web/20020215190133/minorplanetusa. com/print_case.asp?8.*

(Continued)

*Primary Examiner*—Jonathan G Sterrett
(74) *Attorney, Agent, or Firm*—Toler Law Group

(57) ABSTRACT

The disclosure is directed to a service support system that includes a service request interface, a dispatch system interface, and a service assignment module. The service request interface is configured to communicate with a service request system. The dispatch system interface is configured to communicate with a dispatch system. The service assignment module is configured to assign a particular service request to a particular technician based at least in part on a historical technician performance statistic. The particular service request is received via the service request interface. The service assignment module notifies the particular technician of the service request via the dispatch system interface.

32 Claims, 4 Drawing Sheets

OTHER PUBLICATIONS

PRNewswire, "PointServie Launches Breakthrough on-line Scheduling Solutions", Oct. 26, 1999, p. 1, ProQuest ID 45806204.*

Pickus, Jonathan, "A winning hand", Nov. 1999, Geo Info Systems, vol. 9 Iss. 11, p. 30, ProQuest ID 46593275.*

Choy, Manhoi, "Distributed database design for mobile geographical applications", Jan.-Mar. 2000, Journal of Database Management, vol. 11, Iss. 1, p. 3, ProQuest ID 126500841.*

Ursitti, Antoinette, "Wireless Wonders", Nov. 2000, Plumbing & Mechanical, Troy, vol. 17, Iss. 9, p. 58, ProQuest ID 64314569.*

Francett, Barbara, "An execise in utility", Jun. 1997, Software Magazine, vol. 17, Iss. 6, ABI/INFORM Global, p. 75.*

Bush, Rick, "Five Utilities lead the way to the 21st Century", Jan. 1999, Transmission & Distribution World, vol. 51, Iss. 1, p. 14, ProQuest ID 38676882.*

Skydel, Seth, "Growth enabled by technology", Dec. 2000, Fleet Equipment, vol. 26, Iss. 12, p. 38, ProQuest ID 66024622.*

Cohn, Michael, "Follow the Fleet", Mar. 2002, Internet World, vol. 8, Iss. 3, p. 50, ProQuest ID 110781214.*

Pitts, Marilyn, "It's 3:00pm do you know where your trucks are?", Jun. 2002, Reeves Journal, vol. 82, Iss. 6, p. 38, ProQuest ID 129610621.*

Fedex.com web.archive.org's webpage of Jun. 6, 1997, "Fedex Standard Tracking".*

Hickey, Kathleen, "Right Place, Right Time", Nov. 1999, Traffic World, v260, n4, p. 47, Dialog 06791905 57430340.*

Hall, John, R; "New Service Website Holds Promise for Contractors", Nov. 1999, Air Conditioning, Heating & Refrigeration News; 208, 13; ABI/INFORM Global, p. 1.*

Satran, Dick, "Rocket Scientist tries improving the service industry", Oct. 1999, Vancouver Sun, Vancouver, B.C., p. E2, ProQuest ID 08321299.*

Norand.com webpage of Feb. 6, 1998, "NyNex utilizes Pen*Key® mobile computers to retrieve information and execute transfer activity", pp. 1-4, retrieved from the internet: web.archive.org/web/19990206125452/www.norand.com/case_nynex_more.ht.*

Norand.com webpage of Feb. 6, 1998, "Norand—Field Service", pp. 1-2, retrieved from the internet: web.archive.org/web/19990206122627/www.norand.com/sol_fieldservice_tech.ht.*

Norand.com webpage of Feb. 6, 1998, "Are you getting ready to catch the wireless wave", pp. 1-8, retrieved from the internet: web.archive.org/web/19990206122343/www.norand.com/wp_wirelesswave.ht.*

Norand.com webpage of Feb. 6, 1998, "Introducing the Norand RapidREP™ Solution from Intermec Technologies Corporation", pp. 1-3, retrieved from the internet: 19990206114807/www.norand.com/pr_rapidrep.html.*

"Norand-Payback", Norand.com webarchive from Feb. 6, 1998, pp. 1-2, retrieved: web.archive.org/web/19980206121556/www.norand.com/payback/pay_ben.html.*

"Norand Nor*Ware™ remote from Intermec Technologies Corporation improves field communications", Norand.com webarchive from Feb. 6, 1998, pp. 1-3, retrieved: web.archive.org/web/19980206121815/www.norand.com/pr_remote.html.*

Utilities go wireless: Anywhere, anytime—wireless technologies improve efficiency for employees and customers Charles V Maglione. Electric Perspectives. Washington: May/Jun. 2001. vol. 26, Iss. 3; p. 86, 9 pgs.*

Bell Atlantic Software Systems Introduces Alex(R)Plus—the Next Generation of Telecommunications Management Software Smith, Leslie. PR Newswire. New York: May 7, 1992. Sec. 1, p. 1.*

Automated information systems: The key to trucking intelligence Stephen Bennett. Transport Topics. Alexandria: Jan. 13, 2003., Iss. 3519; p. S4, 5 pgs.*

On the edge of geolocation Joshua Israelsohn. EDN. Boston: Mar. 7, 2002.vol. 47, Iss. 5; p. 35, 5 pgs.*

Wireless, remotely updated digital mapping system benefits Southwest Gas Craig Astler, Pipeline & Gas Journal. Dallas: Jul. 2002.vol. 229, Iss. 7; p. 106, 2 pgs.*

New dispatch software is a hot ticket Russell A Carter. Rock Products. Chicago: Jul. 1997.vol. 100, Iss. 7; p. 44, 4 pgs.*

Trucking in real time Richard Shulman. Supermarket Business. New York: Feb. 1999.vol. 54, Iss. 2; p. 14, 5 pgs.*

Intelligent dispatching rules for trip-based material handling systems Bozer, Yavuz A, Yen, Chih-kuan. Journal of Manufacturing Systems. Dearborn: 1996.vol. 15, Iss. 4; p. 226, 14 pgs.*

* cited by examiner

DISPATCH AND SERVICE SUPPORT SYSTEM

FIELD OF THE DISCLOSURE

This disclosure, in general, relates to dispatch and service support systems.

BACKGROUND

Various industries utilize mobile technicians to install, repair, and maintain remote equipment. Such industries include phone companies, cable companies, gas companies, general service repair companies, and other dispatch oriented service companies. One particular example is a phone company that manages a large fleet of service personnel and a large inventory of circuit loops, telephone numbers, switching equipment, and telecommunications equipment.

Difficulties arise in efficiently dispatching technicians with the appropriate skills to a specific job location. This problem is exacerbated by the continual influx of service requests. In addition, each service request may involve changes in multiple locations requiring multiple technical skills and interfacing with multiple support systems. Therefore, an improved dispatch and service support system would be desirable.

SUMMARY

The disclosure is directed to a service support system. The service support system includes a service request interface, a dispatch system interface, and a service assignment module. The service request interface is configured to communicate with a service request system. The dispatch system interface is configured to communicate with a dispatch system. The service assignment module is configured to assign a service request to a technician from a pool of technicians based at least in part on a historical technician performance statistic. The particular service request is received via the service request interface. The service assignment module notifies the particular technician of the service request via the dispatch system interface.

The disclosure is also directed to a workforce administration system. The workforce administration system includes a logic interface, a dispatch interface, and a dispatch module. A logic interface is configured to communicate with a statistical dispatch logic module. The dispatch interface is configured to communicate with a technician dispatch system. The dispatch module is configured to accept dispatch instructions associated with a service order via the logical interface to the statistical dispatch logic module and is configured to transfer service instructions associated with the service order via the dispatch interface to the technician dispatch system.

The disclosure is also directed to a dispatch control system. The dispatch control system includes a mobile technician interface, a frame order management system interface, an order status reporting interface, and an order status monitoring module. The mobile technician interface is configured to communicate with a mobile technician monitoring system. The frame order management system interface is configured to communicate with a frame order management system. The order status monitoring module is configured to access the mobile technician monitoring system via the mobile technician interface to receive service order completion data associated with a service order. The order completion monitoring module is configured to access the frame order management system via the frame order management system interface to receive frame order completion data associated with the service order. The order status monitoring module is configured to provide an order status associated with the service order via the order status reporting interface.

The disclosure is directed to a service order status interface. The service order status interface includes at least one web page configured to access an order status monitoring module. The order status monitoring module is configured to access the technician monitoring system via a technician interface to receive service order completion data associated with a service request. The order status monitoring module is configured to access a frame order management system via a frame order management system interface to receive a frame order completion data associated with the service request. The at least one web page is configured to display a service request status associated with the service request. The service request status is provided by the order status monitoring module and is associated with the service order completion data and the frame order completion data.

The disclosure is directed to a method to facilitate service dispatch. The method includes communicating with a service request system via a service request interface to receive a service request; assigning the service request to a technician from a pool of technicians based at least in part on an historical performance statistic; and notifying the technician of the service request via a dispatch system.

The disclosure is also directed to a method of monitoring order status. The method includes accessing a mobile technician monitoring system via a mobile technician interface to receive service order completion data associated with a service request; accessing a frame order management system via a frame order management system interface to receive frame order completion data associated with the service request; and providing an order status associated with the service request via the order status reporting interface.

BRIEF DESCRIPTION OF THE DRAWINGS

The use of the same reference symbols in different drawings indicates similar or identical items.

DETAILED DESCRIPTION

Figure 1:
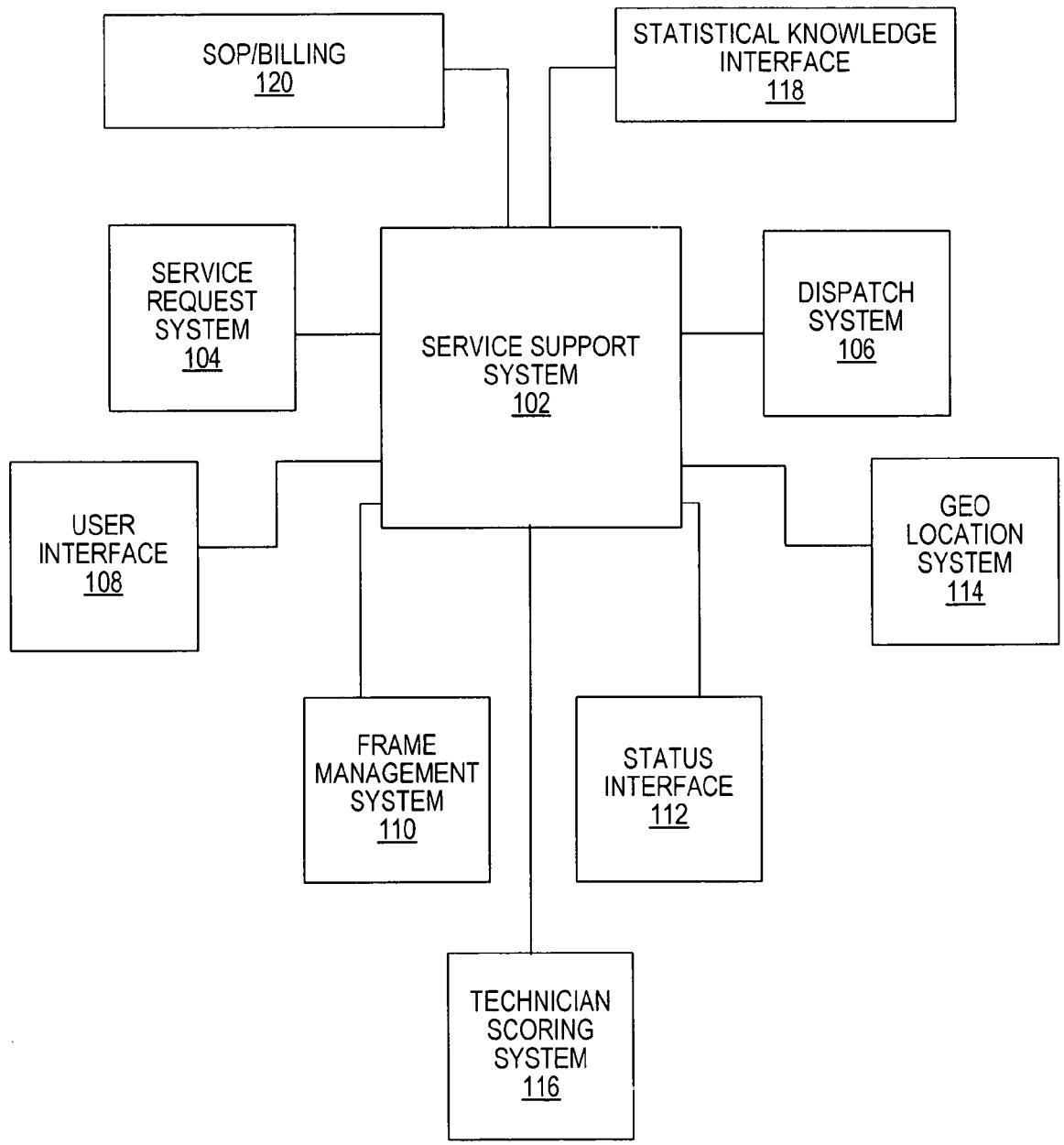
FIG. 1 depicts an exemplary service support system architecture.

FIG. 1 depicts an exemplary embodiment of a service support architecture. Such architecture may be useful in dispatching technicians, managing service request mitigation, and reporting the status of service orders and requests. The architecture includes a service support system 102. The service support system 102 may be coupled to a service request system 104, a dispatch system 106, a user interface 108, a frame management system 110, a status interface 112, a geo-location system 114, a technician scoring system 116, a statistical knowledge interface 118, and a service order provisioning and/or billing system 120. However, the service support system 102 may or may not be coupled to some, all or various combinations of these systems.

The service support system 102 may be a computer server system having one or more processors, various memory and storage systems, and program modules. These elements may function together to provide functions such as service request verification, service request assignment, completion logic, and reporting functions, among others. In one exemplary embodiment, the system is a Unix based system using an Oracle® database.

In one exemplary example, the service support system 102 may interface with a service request system 104 to acquire service orders or requests. The service request system 104 may, for example, be a workforce administration system (WFA/C) or service order and provisioning systems having service request capabilities such as Service Order Retrieval and Distribution (SORD) and Ameritech Service Order Negotiation (ASON). The service support system 102 may process these service requests and determine which technician should be assigned the service request. This determination may be made in part based on a technician's capabilities and an historical statistic such as a particular technician's average time to perform such tasks as required by the service request or service order. The service support system may then dispatch the technician using a dispatch system 106. The dispatch system may be a mobile dispatch interface such as a Global Craft Access System (GCAS). Alternately, the dispatch system 106 may be a Workforce Administration Dispatch-Out system (WFA/DO) having a further interface to a mobile technician interface. The dispatch system 106 may also include internal dispatch systems such as the Workforce Administration Dispatch-In system (WFA/DI), Frame Operations Management Systems (FOMS), or other similar systems directing technicians to work on equipment such as central office equipment or regional office equipment.

The dispatch system 106 or a related system may also provide feedback to the service support system 102 associated with completion or status of service order requests. This data may be used in conjunction with other data to determine technician efficiency scores. Technician efficiency scores may be stored in a technician scoring system 116.

A user interface 108 may be provided for the service support system 102 to monitor and track the performance of the service support system, assign technicians, provide workforce and work load statistics, determine appointment clocks and windows, report service order/request status, manage custom reports, manipulate assignment parameters, and manage other data. The user interface 108, in one exemplary embodiment, may be a web-based interface. The user interface 108 may include Java components.

The service support system 102 may also communicate with other systems, such as a frame management system 110, a status interface 112, a geo-location system 114, a technician scoring system 116, a statistical knowledge interface 1118, and a service order provisioning/billing system 120. The frame management system 110 may be associated with the management of central office equipment. The frame management system 110 may, for example, be the Frame Operations Management System (FOMS). Aspects of the service orders may require manipulation of central office equipment. The interface with the frame management system 110 provides a method for directing the manipulation of central office equipment management systems and receiving status information associated with the request.

A status interface 112 may also be provided to the service support system 102. In the current regulatory environment, Competitive Local Exchange Carriers (CLECs) desire access to status information associated with the Competitive Local Exchange Carrier (CLEC) service orders that are to be performed by the Incumbent Local Exchange Carrier (ILEC). The status interface 112 may take various forms such as a provisioning order status system (POS) or a statistical reporting system such as a Local Access Service Request (LASR) system. The status interface 112 may, for example, be a web-based interface and may include Java components.

The service support system 102 may also have access to a geo-location system 114. The geo-location system 114 may, for example, supply location data associated with technicians. Such a system 114 may include a Global Positioning System (GPS) locator associated with service delivery vehicles. Location data from the geo-location system 114 may be used in determining efficient assignment of technicians to a particular service request. Such location data may be used in conjunction with technician capabilities, historical technician statistics, and associated costs to determine which technician may be preferably assigned to a particular service request.

A statistical knowledge system 118 may also be coupled with the service support system to gather statistical information associated with mitigation of service requests, trouble tickets (problem service orders), workforce and work load statistics and other statistics useful in decision support. Such systems may include statistical systems for providing CLECs with statistical data associated with service request completion such as an LASR system. Alternately, a statistical knowledge system 118 may include a corporate decision support system or a statistical system for analysis of service performance in the mitigation of trouble tickets and order completion such as the Acquisition of Statistical Knowledge Made Easy System (ASKME).

Service order provisioning (SOP) and billing systems 120 may also be coupled to the service support system 102. These systems may also interface with other billing systems and service request systems. Such systems include SORD, ASON, and SONAR, among others. These systems may interface with billing systems such as CRIS and CABS. In one exemplary embodiment, service orders may be entered into an SOP system 120. The service orders may be transcribed and entered into a service request system 104. The service support system 102 may access the SOP/billing system 120 and compare original service order/request images with those received through the service request system 104. In this manner, the service support system may function to further verify service requests and orders.

The service support system 102 may also take into account the various statistics associated with workforce and work load availability. The service support system 102 may utilize these statistics to determine available windows for appointments. These windows may be provided to various service request scheduling systems, such as the Loop Maintenance Operation System (LMOS FE) or Interactive Voice-Response system (IVR) that permit the scheduling of service calls. The user interface 108 may also permit manipulation of appointment windows and other parameters associated with appointment window determination that may be used in the determination of next available appointment windows.

Figure 2:
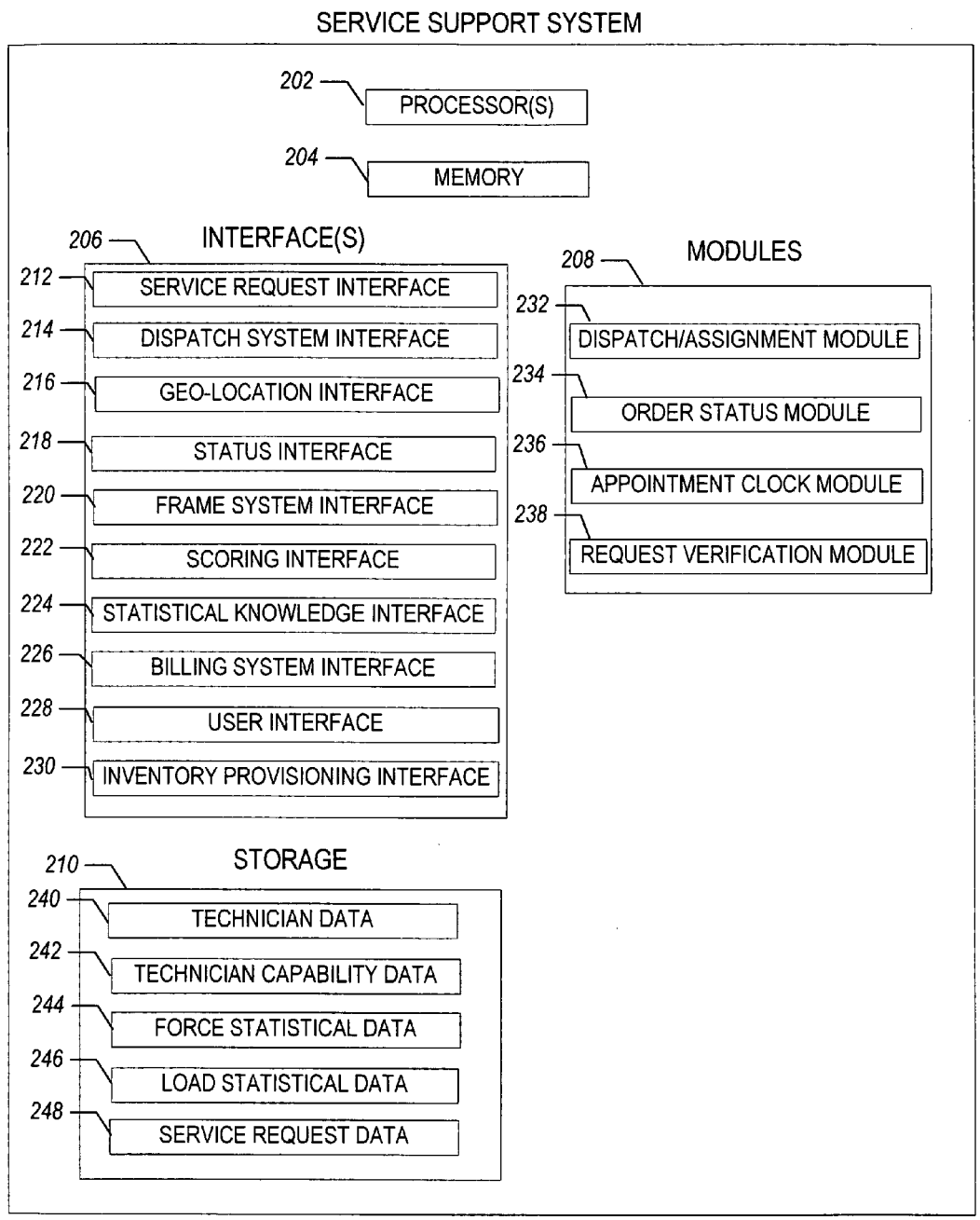
FIG. 2 depicts an exemplary service support system.

FIG. 2 depicts an exemplary embodiment of a service support system 200. The service support system 200 includes processors 202, memory 204, interfaces 206, modules 208, and storage 210. The service support system may take the form of various computational devices or a combination of computational devices operating under operating systems such as Windows and Unix. In one exemplary embodiment, the service support system 200 includes server side devices including Unix servers, Oracle® databases, MQ Series queue processes, and Websphere® web server software. The service support system 200 may communicate with other devices such as other server systems or client side personal computers having a web browser.

The interfaces 206 may take various forms such as terminal emulators, screen scrapers, application interfaces, database calls, command line entries, and web-based and/or Java-based interfaces, among others. The interfaces 206 may include a service request interface 212, a dispatch system interface 214, a geo-location interface 216, a status interface 218, a frame system interface 220, a scoring interface 222, a statistical knowledge interface 224, a billing system interface 226, a user interface 228, and an inventory provisioning interface 230. The service request interface 212 may interact with a service request system or a service order provisioning system. In one exemplary embodiment, the service support system 200 acquires service orders and service requests from a service request system such as a WFA/C via the service request interface 212. In an alternate embodiment, service requests and service orders may be acquired from a service order provisioning system via the service request interface 212. The service orders and requests may come as word documents, text documents, delimited text files, fielded files, or data files. In one exemplary embodiment, the service support system 200 may interface with a service order provisioning system and a service request system. The service request image file from the service order provisioning system may be compared with a service order or request from the service request system such as WFA/C. In this manner, service requests may be further authenticated or verified.

The dispatch system interface 214 may interact with a dispatch system. This interaction may be directed with a mobile technician system such as a Global Craft Access System (GCAS). Alternately, the dispatch system interface 214 may interact with a Workforce Administration System such as a WFA/DO system, which in turn interacts with the mobile technician system. The dispatch system interface 214 may also interact with internal dispatches such as a WFA/DI system. Using the dispatch system interface, the service support system 200 may assign service orders to particular technicians and in some embodiments, acquire completion data or data associated with the service order request.

The service support system 200 may also include a geo-location interface 216. The geo-location interface 216 may interact with a geo-location system such as a Technician Reporting System (TRACE). The technician reporting system may provide location information such as global positioning locations. The service support system 200 may then use this information in conjunction with other technician-associated data to determine which technician should be assigned a particular service order.

The status interface 218 may permit access by outside order status systems, or may provide a web-based interface into the service support system 200. The status interface 218 may also include a Java component. In one exemplary embodiment, CLECs may access order status information through a web interface. In an alternate embodiment, status information may be passed to a service order processing system such as SORD or ASON or a service order reporting system such as Local Access Service Request (LASR).

Mitigating and processing service orders and service requests may involve manipulations to frames and central office equipment. A frame system interface 220 may be provided to access systems such as a Frame Operations Management System (FOMS). Task information associated with a service order may be transmitted to the FOMS system and information about completion of the task or status of the task may be transmitted to the service support system 200 through the frame system interface 220. Other systems involving internal dispatches may also be provided by interfaces such as the WFA/DI. Furthermore, inventory tracking systems and assignment systems may be provided similar interfaces.

As tasks associated with service orders are complete, job statistics associated with technicians may be developed and stored. In one exemplary embodiment, a scoring interface 222 is provided which may interact with technician scoring systems such as Techscore that store technician efficiency data. Other statistics associated with job completions, trouble tickets, service order completions, and incorrect service requests may be stored in other systems. In one exemplary embodiment, a statistical knowledge interface 224 is provided, which may access regulatory and corporate management systems such as ASKME and DSS. These systems provide corporate and regulatory access and oversight to the service order and dispatch process.

A billing system and service order processing system interface 226 may be provided for accessing service order processing systems and billing systems. In one exemplary embodiment, billing systems may be accessed directly. Alternately billing systems may be accessed via the service order processing systems. For example, CRIS/CABS systems may be accessed through SORD, ASON, or other systems. The service support system 200 may utilize the billing systems interface 226 to confirm completion of a service order and facilitate the billing associated with that service order.

The system may also provide a user interface 228. The user interface may be used to provide reporting functions, parameter and setting manipulation, job and service request monitoring, workforce and work load monitoring, technician assignment, appointment window or clock parameter manipulation, and report customization. The user interface 228 may, for example, take the form of a web-based user interface such as web pages. The user interface 228 may also include java components. In one exemplary embodiment, the user interface 228 may be used to manipulate appointment window parameters. In another exemplary embodiment, the user interface 228 may be used to manipulate technician assignment. In a further exemplary embodiment, the user interface 228 may be used to provide local and regional reports. These local and regional reports may, for example, be customizable through the selection of search criteria and reported data. In another example, the user interface 228 may be used to assign technicians to areas or regions for specified times. Changing the assignment of a technician affects the workforce and work load determinations in a given area, which may alter appointment clocks and task or service order assignment.

The system may also include an inventory-provisioning interface 230. This inventory-provisioning interface 230 may permit the tracking and manipulation of inventory and assignment data through systems such as Loop Facility Assignment Control System (LFACS) and SWITCH. An inventory-provisioning interface 230 may be provided directly to LFACS and SWITCH, or, in an alternate embodiment, may be provided through other systems such as a Facts Internal Resolution Technology System (FIRST). In one exemplary embodiment, screen scraping techniques may be used to access and manipulate data in the LFACS and SWITCH systems.

The service support system 200 may also include various storage systems 210. These systems may include databases such as an Oracle® database. Databases may be provided for technician data 240, technician capability data 242, workforce statistical data 244, work load statistical data 246 and service request data 248. The technician data 240 may include data such as the assigned regional location of a technician, the geo-location of a technician, personal technician data, schedule data, and availability data. The technician capability data 242 may be separate from or combined with the technician data 240. The technician capability data 242 may include statistical data associated with the past performance of technicians for given tasks and may include default assumptions for task having little associated data. The statistical data may include average time on a task, maximum or minimum times, mean or median times, default assumptions and binary input regarding technician ability. In one exemplary embodiment, the technician capability data 242 and statistics may be used in determining assignments of service requests. For example, a mean or median completion time associated with a specific task associated with a service request may be used in determining whether a particular technician should be assigned to a service request.

The storage 210 may also include workforce statistical data 244. This data may be aggregate workforce data collected over an extended period of time. In addition, work load statistical data 246 may be included, which includes statistical data associated with work load and service orders accumulated over a period of time. The work load statistical data 246 may include information about past service request volume. Similarly, the workforce statistical data 244 may include information about previous workforce availability. Together the workforce and work load statistics may be useful in forecasting work load volume and work force utilization.

The storage 210 may also include service request data 248. The service request data 248 may include service request documents and images, dispatch information associated with service requests, task and job data associated with service orders, and status data associated with service orders. The service request data 248 may be useful in supplying service status, dispatching service orders, and determining billing information.

The modules 208 may take the form of scripts and programs associated with the service order support system 200 function. The modules 208 may be separate programs or may comprise routines within a program or scripts and queries within a database. The dispatch/assignment module 232 processes a service request received via the service request interface 212 to determine which tasks are associated with the service request. The dispatch/assignment module 232 may determine to which technicians to assign the tasks associated with the service order. In making this assignment, the dispatch/assignment module 232 may take into account technician capabilities, statistical information associated with expected task completion times, and technician location relative to job location. In another embodiment, technician information, location, and the task may have a cost weighting associated with them to aid in determining technician assignment or help in monitoring dispatch/assignment module 232 performance. The dispatch assignment module 232 may access a geo-location system to determine the location of a technician through the geo-location interface 216. In one exemplary embodiment, the dispatch/assignment module 232 may determine expected job completion times associated with a technician based on technician statistics and use that information in conjunction with a geo-location to determine which technician may be assigned to a specific task. For example, based on technician statistics, a technician A may be expected to complete a first task five minutes hence and have an expected travel time to the next task of ten minutes. Technician B may have completed a task but be expected to travel 20 minutes to the next task. In one case, the dispatch/assignment module 232 may assign the task to the technician A while leaving technician B idle or assigning a subsequent task to technician B.

The order status module 234 may acquire information from technicians, Frame Operations Management Systems (FOMS), and other systems such as WFA/DI and WFA/DO to determine the status of an order. In one exemplary embodiment, tasks associated with the service order may include manipulation of frames and central office equipment as well as tasks utilizing a mobile service technician. In these situations, before a service order should be reported as complete, both the central office equipment tasks and the mobile service order tasks should be complete. The order status module 234 may delay reporting completed status until all the expected completion data is acquired. The service order module may interact with a dispatch system interface 214, a frame system interface 220 or an inventory provisioning interface 230 to acquire the appropriate information. Subsequently, the order status module 234 may communicate through a status interface 218, a billing system interface 226, a statistical knowledge interface 224, or a user interface 228 to communicate order status. In one exemplary embodiment, a web-based status interface 218 may access the order status module 234 to acquire service order status data associated with a CLEC.

Another module is the appointment clock module 236. In determining when incoming service requests are to be processed or in determining what appointment window to apply to incoming service requests, the appointment clock module 236 may monitor workforce statistical data 244, work load statistical data 246, technician data 240 and service request data 248 to determine what clock time to provide. The user interface 228 may also access the appointment clock module 236 to establish appointment window parameters. These parameters may include window size, among others. In addition, the user interface 228 may manipulate regional or area technician assignments, which may affect workforce availability and, thus, affect appointment clocks and windows. The appointment clock module 236 may interact with an LMOS system or an IVR system to automatically update appointment clock times and windows.

The service support system 200 may also include a request verification module 238. The request verification module 238 may, for example, acquire service requests through the service request interface 212 or an SOP/billing system interface 226. In one exemplary embodiment, the service verification module 238 may acquire a service request interface or image from a service order processing system and compare that to the service request acquired through a workforce administration control module (WSA/C). In this manner, errors acquired in the processing of service orders may be mitigated, preventing wasted dispatch time and facilitating quicker service order processing. The comparison may, for example, involve parsing the service order and the service order image to find and compare comparable fields.

Figure 3:
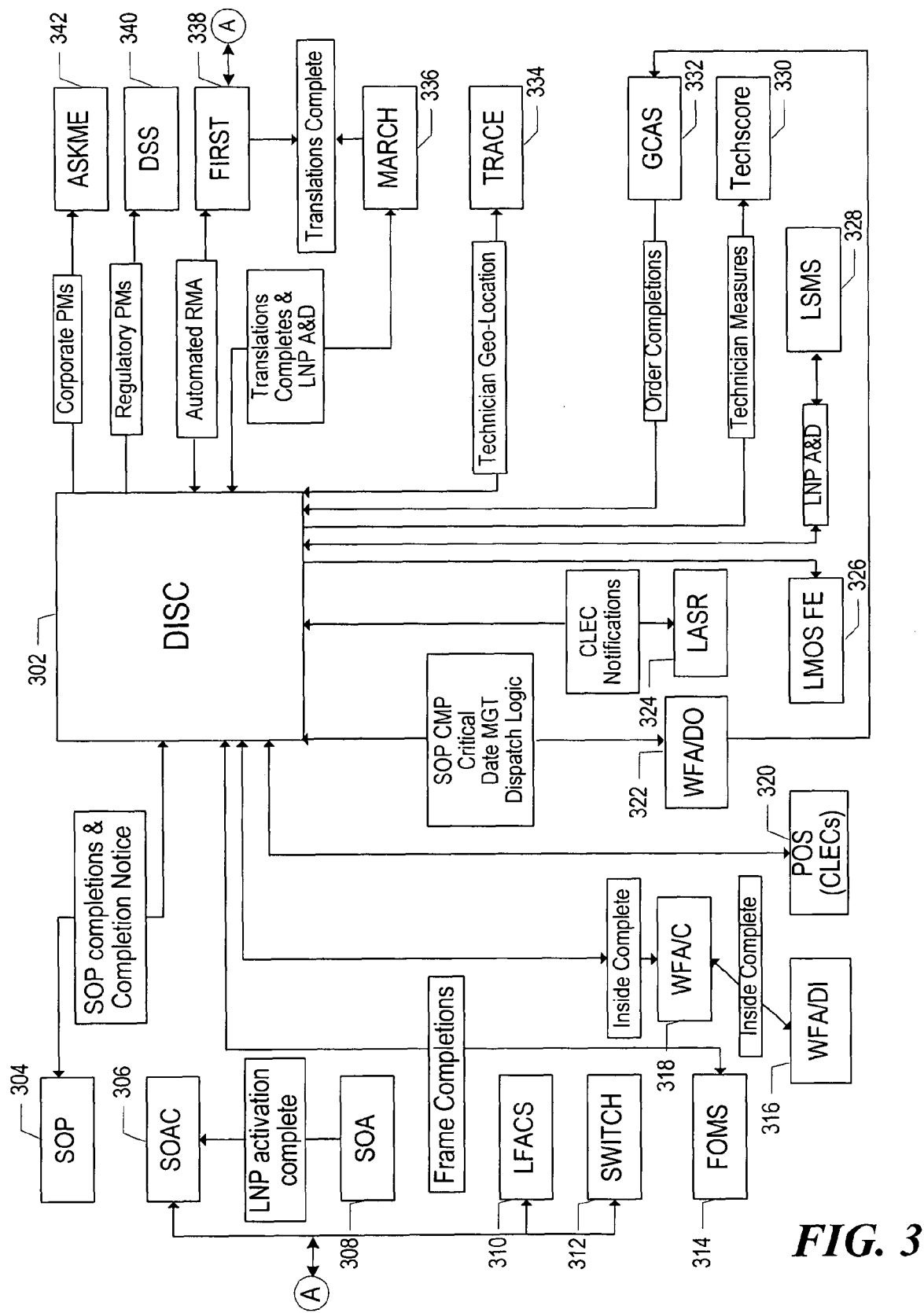
FIG. 3 depicts one specific embodiment of service support system architecture.

FIG. 3 depicts an exemplary dispatch and service support system architecture. This exemplary system includes a centralized dispatch and service support system 302. The service support system 302 may have interfaces to the service order processing system 304, inventory and facility assignment systems (Service Order Analysis and Control (SOAC) 306, SOA 308, LFACS 310, SWITCH 312), interfaces to Frame Operations Management System (FOMS) 314, workforce administration control dispatch in and dispatch out systems 318, 316 and 322, Provisioning Order Status (POS) systems 320, Local Access Service Request (LASR) systems 324, Loop Maintenance Operating Systems (LMOS) 326, Local Service Management Systems 328, Techscore systems 330, Global Craft Access Systems (GCAS) 332, tech reporting systems 334, MARCH 336, Facts Internal Resolution Technology System (FIRST) 338, Decision Support Systems 340, and Acquisition of Statistical Knowledge Made Easy systems (ASKME) 342.

In one exemplary embodiment, the service support system 302 acquires service request document from the WFA/C system 318. This service request document may be compared with a service request image acquired from a service order processing (SOP) system 304. Service order processing system may include systems such as SORD and ASON. Further, these systems may be coupled with billing systems such as CRIS and CABS. Using technician capability data, and in some exemplary embodiments, geo-location data determined from the TRACE 334 system, the service support system 302 may assign tasks associated with the service request to particular technicians. This assignment may be sent directly to a technician system such as the GCAS 332 or may indirectly be provided to a technician through a legacy system such as WFA/DO 322 or WFA/DI 316. In addition, the service request may have tasks utilizing frame and central office equipment. The service support system 302 may transmit and receive information associated with frame tasks through the interface to the FOMS 314 system.

In preparation for the service requests or in reporting inventory and assignment changes, the service support system 302 may access systems such as LFACS 310 and SWITCH 312. This access may be direct or may be provided through systems such as FIRST 338. In one exemplary embodiment, the LFACS 310 and SWITCH 312 are accessed through a screen-scraping methodology. The service support system 302 may also access a Service Order Analysis and Control (SOAC) system 306. The SOAC 306 may act as an interface between the SOP systems 304 and the facility assignment systems such as LFACS 310. The SOAC 306 may translate USOC type information from the service orders into requests for needed facilities.

As tasks are completed, the service support system 302 may receive notification through the GCAS 332 or the FOMS system 314. As service order tasks are complete, the service order system 302 may store the status of completed tasks and the status of the service request as a whole. The status may be reported through a service order processing (SOP) system 304, in which case billing may be generated. The service support system 302 may also report status completes through a provisioning order status system (POS) 320 and a local access service request (LASR) system 324. The POS system 320 may be a web-based interface to provide CLECs with information associated with service requests. The LASR system 324 may provide statistical data on service request completions associated with those service requests requested by CLECs.

In some cases, service requests may involve the portability of local telephone numbers. In this case, the service support system may interact with a Local Service Management System (LSMS) 328 to assign and dispense local telephone numbers. Furthermore, the assignment and dispatching of local numbers may be reported through a MARCH system 336. In some cases, status regarding unused telephone number pools may be reported to a CLEC through the LASR system 324.

As service orders are received and processed and technicians work on the service orders, statistical data may be gathered and associated with the service orders and the technician performance. Some of this data may be stored in the service support system 302. Technician related efficiency data may be stored in systems such as a Techscore system 330. Data associated with trouble tickets and order completion may be recorded through a corporate statistical system such as ASKME 342 or regulatory accessed systems such as DSS 340. Those service orders having problems or difficulties requiring manual assistance may be reported to a FIRST system or the MARCH system 338.

In addition, the service support system 302 may perform workforce and work load calculations to determine appointment windows in which service may be provided. These appointment windows may be sent to a loop maintenance operating system (LMOS) 326 or directly to an interactive voice response (IVR) system through which customers and requesters of service orders may be provided with an expected appointment window for handling a service request. In one exemplary embodiment, a requester of service may be provided with options based on anticipated workforce and work load calculations.

Figure 4:
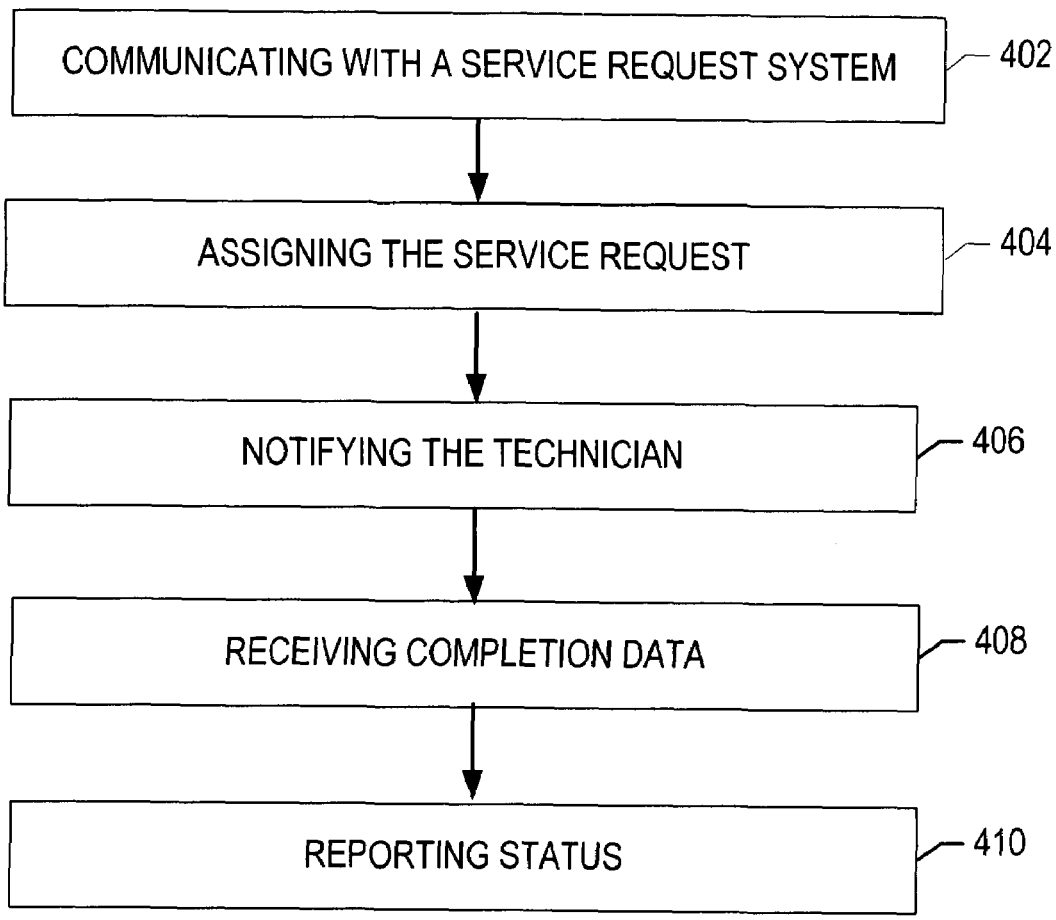
FIG. 4 illustrates an exemplary method to facilitate service dispatch.

FIG. 4 illustrates an exemplary method to facilitate service dispatch. At step 402, the service support system communicates with a service request system. The service request system may be an SOP system or a WFA/C system. The service request is assigned to a technician, as shown in step 404. The technician may be one in a pool of available technicians. The pool of technicians may be further subdivided into service areas or regions with boundaries that may be hard or soft geographic boundaries. Further, technicians may be assigned to differing regions at different times. The assignment of a task to a particular technician may be determined through a business logic that considers factors such as current technician location, technician skill sets, statistic data associated with the technician, and workforce and work load projections. The statistical data may, for example, be average, maximum, or minimum completion times associated with tasks associated with the service request. In one exemplary embodiment, the system may check travel time and expected completion times to determine which technician to assign. For example, technician A may be idle and located 20 minutes from the service location. Technician B may be 10 minutes from the job and be expected to finish a current task in 5 minutes based on statistical job completion date. Depending on the weighting of travel time, the service support system may assign the task to technician B and assign another service request to technician A.

The service support system may notify the technician of the service request, as shown in step 406. This notification may be through a mobile technician system. Alternately, the service support system may send dispatch information to a workforce administration system such as a WFA/DO or DI system, which, in turn, sends the dispatch information to the technician via a mobile technician system.

The service support system may also interface with the mobile technician system to acquire completion data associated with the service request, as shown in step 408. The completion data may be an indication that tasks associated with the service request have been completed. Alternately, data indicating trouble with the service request may be sent via the mobile technician system to the service support system. The service support system may also interface with other systems such as internal dispatch systems and frame order management systems to acquire completion or trouble ticket data.

The service support system may also report the status of the service request, as shown in step 410. This report may be in the form of a web-based interface and may have a Java component. The interface may be accessible by CLECs, for example. Alternately, the service support system may report status to various statistical systems, SOP/billing systems, and regulatory systems.

Figure 5:
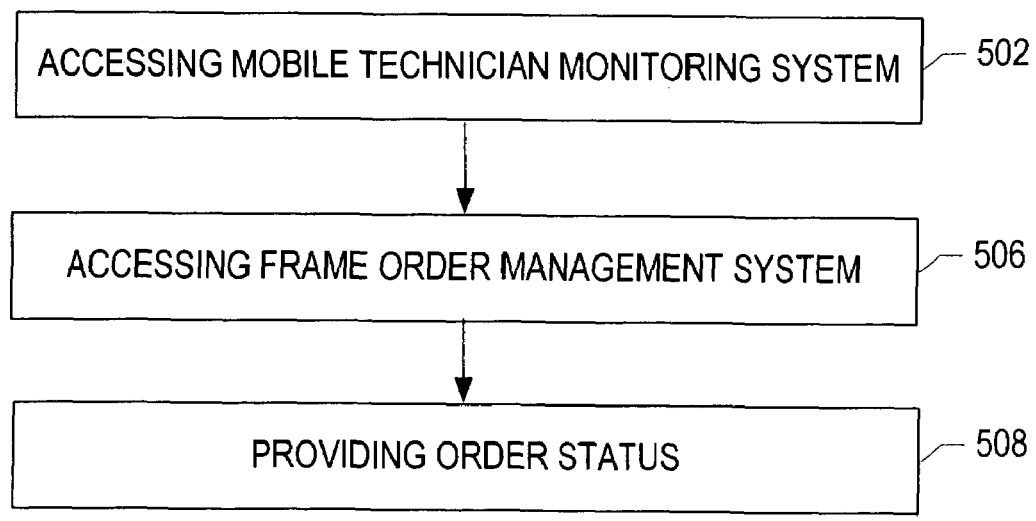
FIG. 5 illustrates an exemplary method of monitoring order status.

FIG. 5 illustrates an exemplary method to monitor order status. A mobile technician monitoring system is accessed by the service support system, as shown in step 502. Completion data or trouble ticket information may be transferred to the service support system. In addition, a frame order management system is accessed by the service support system, as shown in step 506. The mobile technician monitoring system and the frame order management system may be accessed in various orders and more than once. The service support system may also provide an order status, as shown in step 508. The order status may be provided through a web-based interface or to various statistical, regulatory, and SOP/billing systems. The order status may be shown as complete upon receipt of both the completion data from the frame order management system and the completion data from the mobile technician monitoring system.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A service support system comprising:
   a service request interface including a service request processor and configured to communicate with a service request system;
   a dispatch system interface including a dispatch processor and configured to communicate with a dispatch system configured to utilize historical work force and work load statistics to formulate dispatch instructions;
   a service support processor configured to execute instructions residing in a service assignment module; and
   a memory to store:
      the service assignment module comprising processor-executable instructions that when executed by the service support processor, cause the service support processor to:
         assign a first service request to a technician associated with an Incumbent Local Exchange Carrier (ILEC) from a pool of available technicians based at least in part on a historical performance statistic of the technician, and a first location of the technician determined at least in part from global positioning location data associated with a Global Positioning System (GPS) locator, the first service request received via the service request interface;
         notify the technician of the first service request via the dispatch system interface; and
         assign a second service request to the technician based at least in part on a second location of the technician after receiving service order completion data and frame order completion data related to the first service request, wherein the service order completion data and the frame order completion data related to the first service request indicate that tasks associated with the first service request are complete.

2. The service support system of claim 1, further comprising a geo-location interface configured to access the GPS locator to determine the first location of the technician, the second location of the technician, or any combination thereof.

3. The service support system of claim 1, further comprising a service request status interface to access status data associated with the first service request, the second service request, or any combination thereof.

4. The service support system of claim 3, wherein the service request status interface is a web-based interface.

5. The service support system of claim 3, wherein the service request status interface is accessible to a competitive local exchange carrier.

6. The service support system of claim 1, further comprising:
   a frame system interface configured to access a frame operation management system, the service assignment module configured to transfer frame related service requests to the frame operation management system via the frame system interface.

7. The service support system of claim 1, further comprising:
   a scoring interface configured to access a technician scoring system, the technician scoring system storing an efficiency scoring associated with the technician.

8. The service support system of claim 1, further comprising:
   a statistical knowledge interface configured to access a statistical knowledge system, the statistical knowledge system storing statistical data associated with the service request.

9. The service support system of claim 1, further comprising:
   a billing system interface configured to communicate with a billing system, the billing system to receive completion data associated with the service request.

10. The service support system of claim 1, further comprising a user interface to provide data associated with the technician.

11. A work force administration system comprising:
    a dispatch interface configured to communicate with a technician dispatch system;
    a processor to execute instructions stored in memory; and
    a memory accessible to the processor, the memory storing a dispatch module comprising computer-executable instructions that when executed, cause the processor to:
       receive a service order via a service request interface;
       access technician statistics associated with each of a plurality of technicians, the technician statistics indicating an expected travel time to a location associated with the service order and an expected time remaining to complete a current task, wherein the expected travel time for each respective technician is based on a location of the respective technician relative to the location associated with the service order, wherein the location of the respective technician is determined at least in part from a global positioning location received from a Global Positioning System (GPS);
       assign at least one task of the service order to a technician of the plurality of technicians, wherein the technician is associated with an Incumbent Local Exchange Carrier (ILEC), wherein the assignment is based at least in part on the technician statistics of each of the plurality of technicians while the technician is engaged in the current task;
       utilize historical work force and work load statistics to formulate dispatch instructions associated with the service order; and
       transfer service instructions associated with the service order via the dispatch interface to the technician dispatch system.

12. The work force administration system of claim 11, wherein the dispatch module utilizes the global positioning location received from the GPS system based at least in part on GPS data generated by a GPS locator associated with the technician to formulate the dispatch instructions.

13. A system comprising:
a mobile technician interface configured to communicate with a mobile technician monitoring system;
a processor adapted to execute instructions stored in memory; and
a memory accessible by the processor, the memory storing:
a frame order management system interface including processor-executable instructions that when executed, cause the processor to directly manipulate a central office equipment management system via communication with a frame order management system;
a web-based order status reporting interface;
a dispatch module that utilizes historical work force and work load statistics to formulate dispatch instructions associated with a service request;
an assignment module including processor-executable instructions that when executed, cause the processor to:
assign a first task of the service request via the mobile technician interface wherein the first task is assigned based at least in part on Global Positioning System (GPS) data received from a Global Positioning System (GPS); and
assign a second task of the service request via the frame order management system interface;
wherein the first task or the second task is assigned to a technician associated with an Incumbent Local Exchange Carrier (ILEC); and
an order status monitoring module including additional processor-executable instructions that when executed, cause the processor to access the mobile technician monitoring system via the mobile technician interface to receive service order completion data associated with the first task and configured to access the frame order management system via the frame order management system interface to receive frame order completion data associated with the second task, and to provide an order status associated with the service request based on the service order completion data and the frame order completion data via the web-based order status reporting interface.

14. The system of claim 13, wherein the additional processor-executable instructions within the order status monitoring module, when executed, cause the processor to report a complete status associated with the service request upon receipt of both the service order completion data and the frame order completion data.

15. The system of claim 13, further comprising an internal service management interface configured to communicate with an internal service management system, and wherein the additional processor-executable instructions within the order status monitoring module, when executed, cause the processor to access the internal service management system via the internal service management interface to receive internal service completion data.

16. The system of claim 13, further comprising:
a service order request interface configured to communicate with a service order request system; and
wherein the dispatch module is configured to access the service order request system to receive the service request.

17. The system of claim 13, further comprising an inventory provisioning interface configured to access a public switch telephone network inventory system.

18. The system of claim 13, wherein the web-based order status reporting interface is configured to provide access to a competitive local exchange carrier.

19. The system of claim 13, wherein the web-based order status reporting interface comprises:
a processor to post a web page, the web page based at least in part upon processor-executable instructions associated with the web page and stored in memory; and
a memory storing an order status monitoring module comprising the processor-executable instructions associated with the web page that when executed by the processor, provides access to:
the service order completion data;
the frame order completion data; and
a service request status associated with the service order completion data and the frame order completion data.

20. The system of claim 19, wherein the web page is accessible by a competitive local exchange carrier.

21. A method comprising:
assigning a first task related to a service request to a first technician via a mobile technician interface, wherein the first task is assigned based at least in part on a technician location determined at least in part based on data received from a Global Positioning System (GPS) locator;
assigning a second task related to the service request to a second technician via a frame order management system interface, wherein the first technician or the second technician is associated with an Incumbent Local Exchange Carrier (ILEC);
formulating dispatch instructions based at least in part on historical work force and work load statistics;
accessing a mobile technician monitoring system via the mobile technician interface to receive service order completion data associated with the first task;
accessing a frame order management system interface to receive frame order completion data associated with the second task; and
providing an order status associated with the service request based on the service order completion data and the frame order completion data via a web-based order status reporting interface.

22. The method of claim 21, further comprising:
notifying the first technician of the first task via a dispatch system interface.

23. The method of claim 21, further comprising accessing status data associated with the service request via a service request status interface.

24. The method of claim 23, wherein the service request status interface is a web-based interface.

25. The method of claim 21, further comprising accessing a technician scoring system via a scoring interface, the technician scoring system storing an efficiency scoring associated with the technician.

26. The service support system of claim 1, wherein the second location of the technician is different from a third location, wherein the third location is associated with the first service request.

27. The system of claim 13, wherein the GPS data is received from a GPS locator associated with a service delivery vehicle.

28. The system of claim 13, wherein the second task is associated with work on central office equipment.

29. The method of claim 21, wherein the second task is associated with work on central office equipment or work on regional office equipment.

30. The method of claim 21, wherein the frame order management system interface is configured to directly manipulate a central office equipment management system.

31. The system of claim 1, wherein the GPS locator is associated with a service delivery vehicle.

32. The system of claim 22, wherein the GPS data is received from a GPS locator associated with a service delivery vehicle.

* * * * *